United States Patent
Stawitz

(10) Patent No.: US 6,251,177 B1
(45) Date of Patent: Jun. 26, 2001

(54) SOLID PHTHALOCYANINE PREPARATIONS

(75) Inventor: Josef-Walter Stawitz, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/457,161

(22) Filed: Dec. 8, 1999

(30) Foreign Application Priority Data

Dec. 21, 1998 (DE) ................................. 198 58 965

(51) Int. Cl.⁷ .......................... C09B 67/22; C08K 5/34
(52) U.S. Cl. ........................ 106/410; 8/661; 106/31.46; 106/411; 106/412; 106/413; 540/122; 540/139; 540/140
(58) Field of Search ..................... 106/410, 411, 106/412, 413, 31.46; 8/661; 540/122, 139, 140

(56) References Cited

U.S. PATENT DOCUMENTS

| | | | |
|---|---|---|---|
| 3,647,496 | * 3/1972 | Bagai et al. | 106/411 |
| 3,960,587 | * 6/1976 | Huille et al. | 106/411 |
| 4,589,922 | * 5/1986 | Donegan | 106/413 |
| 5,248,336 | * 9/1993 | Gerson et al. | 106/411 |
| 5,279,622 | * 1/1994 | Stawitz et al. | 8/661 |
| 5,356,444 | * 10/1994 | Schwarz et al. | 8/638 |
| 5,489,330 | 2/1996 | Wunderlich | 106/31.46 |

FOREIGN PATENT DOCUMENTS

| 101163 | * 2/1984 | (EP) . |
|---|---|---|
| 1-297468 | 11/1989 | (JP) . |

* cited by examiner

*Primary Examiner*—Anthony Green
(74) *Attorney, Agent, or Firm*—Joseph C. Gil; Richard E. L. Henderson

(57) ABSTRACT

Solid preparations of metal-containing or metal-free phthalocyanine dyes, a) which have an average particle size of greater than 100 $\mu$m, and b) which have a pH of greater than or equal to 10 when dissolved in 10 times the amount of water, are particularly suitable for the dyeing and printing of paper, after dissolution in water.

14 Claims, No Drawings

SOLID PHTHALOCYANINE PREPARATIONS

The invention relates to solid preparations of phthalocyanine dyes, to a process for their preparation, and to their use for the dyeing of cellulosic materials.

Liquid preparations of copper phthalocyanine dyes are known, for example, from EP-A 596,383 (counterpart of U.S. Pat. No. 5,489,330) and JP-297 468 and are used for the dyeing of cellulosic materials, in particular of paper. Such liquid preparations, which generally have a dye content of from 5 to 25% by weight, are subject to high requirements as, regards storage stability. In this connection, they must not exhibit dye precipitation over a long period since, on the one hand, this changes the set dye content and, on the other hand, can block the metering equipment.

We have now found solid preparations of metal-containing or metal-free phthalocyanine dyes which
a) have an average particle size of greater than 100 μm, and
b) have a pH of greater than or equal to 10 when dissolved in 10 times the amount of water.

Solid preparations, which preferably have an average particle size like that of the preparations according to the invention, are generally referred to as granules. The preparations according to the invention preferably have an average particle size of from 100 to 800 μm, in particular from 100 to 400 μm. The pH of the aqueous solution which is automatically established
when the solid preparation is dissolved in 10 times the amount of water is preferably from 10 to 13, in particular from 11.0 to 12.5.

The preparation according to the invention preferably comprises metal-containing phthalocyanines, in particular Cu or Ni phthalocyanines. They particularly preferably comprise Cu phthalocyanines containing sulphonamide groups.

The metal-containing or metal-free phthalocyanines, in particular Cu phthalocyanines, carry, in a preferred embodiment, sulphonamide groups and sulphonic acid groups, where, in particular, from 0.5 to 3, in particular from 0.5 to 2, sulphonic acid groups are present per phthalocyanine molecule. Also preferred are phthalocyanines, in particular Cu phthalocyanines, which have an aliphatic sulphonamide as sulphonamide.

Particular preference is given to Cu phthalocyanines which, in the form of the free acid, carry
  y $SO_3H$ groups and
  x identical or different radicals of the formula $-SO_2NHB$, where, if the radicals $SO_2NHB$ are different, their sum per molecule is x,
in which
  B is an optionally substituted aliphatic or cycloaliphatic radical, and
  x is from 1 to 3.5, and
  y is from 0.5 to 3.0
and the sum x+y is from 2.5 to 4.
Preferably,
x is from 2 to 3.5, and
y is from 0.5 to 2.0
and the sum x+y is from 2.5 to 4, preferably from 3 to 4.

In a preferred embodiment, the solid preparation comprises copper phthalocyanines which, in the form of the free acid, correspond to the formula (I)

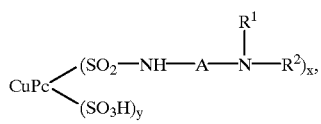

in which
CuPc is a copper phthalocyanine radical,
A is an optionally substituted straight-chain or branched $C_2$–$C_6$-alkylene,
$R^1$ and $R^2$ independently are hydrogen, or in each case are optionally substituted straight-chain or branched $C_1$–$C_6$-alkyl, in particular optionally substituted $C_1$–$C_6$-hydroxyalkyl, and are unsubstituted $C_1$–$C_6$-alkyl, or $R^1$ and $R^2$ together with the N atom to which they are bonded form a heterocyclic 5- or 6-membered ring which optionally contains other heteroatoms, in particular S, N and O,
x is from 1 to 3.5, in particular from 2 to 3.5,
y is from 0.5 to 3, in particular from 0.5 to 2
and the sum x+y is from 2.5 to 4, preferably from 3 to 4.

Possible substituents for straight-chain or branched $C_2$–$C_6$-alkylene in the definition of A are, for example, OH and/or $C_1$–$C_6$-alkoxy.

Possible substituents for straight-chain or branched $C_1$–$C_6$-alkyl in the definition of RI and $R^2$ which may be mentioned are, for example: OH, $C_1$–$C_6$-alkoxy, sulpho, amino, $C_1$–$C_6$-alkylamino and/or $C_1$–$C_6$-dialkylamino, where the alkyl radicals of the amino substituents are optionally substituted, preferably by OH, COOH and $SO_3H$.

Preference is given to preparations which comprise copper phthalocyanine compounds of the formula (1), in which A is ethylene or propylene,
$R^1$ and $R^2$ independently of one another are hydrogen or straight-chain or branched $C_1$–$C_4$-alkyl optionally substituted by OH, $CO_2H$ or $SO_3H$, in particular unsubstituted $C_1$–$C_3$-alkyl, preferably $CH_3$.

Particular preference is given to preparations comprising at least one compound of the formulae (IIa) to (IId)

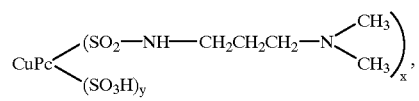

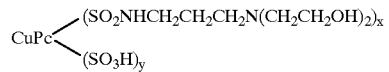

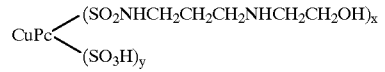

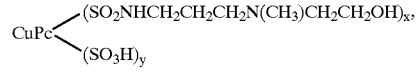

in which
CuPc, x and y have the broadest meanings given for the abovementioned formulae.

The solid preparations according to the invention preferably comprise
from 60 to 98% by weight, in particular from 60 to 90% by weight, preferably from 70 to 85% by weight, of metal-containing or metal-free phthalocyanine dyes, in particular copper phthalocyanine dyes, from 2 to 12% by weight, in particular from 5 to 10% by weight, of residual moisture, from 0 to 25% by weight, in particular from 10 to 20% by weight, of inorganic salts, from 0 to 4% by weight, in particular from 0 to 1% by weight, of further additives, in each case based on the preparation, the sum of said additives giving 100%.

The preparations according to the invention are particularly low in dust and free-flowing and are characterized by very good storage stability. Furthermore, upon stirring into water, they exhibit a high dissolution rate and dissolve completely.

The invention further relates to a process for the preparation of the solid preparations according to the invention, which is characterized in that an aqueous solution or suspension of a metal-containing or metal-free phthalocyanine dye is adjusted to a pH such that, after dissolution of the dried phthalocyanine preparation in 10 times the amount of water, the pH is greater than or equal to 10, and this solution or suspension, optionally after the addition of further additives, is dried.

The aqueous solution or suspension to be dried preferably comprises from 10 to 50% by weight of metal-containing or metal-free phthalocyanine, and optionally inorganic salts, in particular neutral salts, such as, for example, sodium chloride and/or sodium sulphate. Suitable further additives are, for example, surfactants, wetting agents, dedusting agents etc. Preferred further additives are surfactants. The bases which may still be present are also included under further additives.

Preferably, the reaction solution or suspension is used directly as solution or suspension to be dried.

Particularly preferably, the alkaline solutions which are produced in the preparation of the phthalocyanine dyes are dried directly without flirther additives.

It can also be advantageous to purify, in particular to demineralize, the aqueous solution or suspension to be dried using membrane techniques prior to drying.

The drying to form the solid preparation according to the invention can be carried out in a variety of ways. Preference is given to spray drying, suitable spraying elements being, inter alia, either rotating discs or else single- or two-component nozzles. Preference is given in this connection to the single-component nozzle, in particular the swirling chamber nozzle, which is preferably operated at a feed pressure of from 20 to 80 bar.

The inlet and outlet temperatures for the spray drying are dependent on the desired residual moisture, on the safety measures and economical factors. The inlet temperature is preferably from 150 to 180° C., and the outlet temperature is from 40 to 80° C.

The base used to adjust the pH is preferably alkali metal hydroxide, in particular NaOH and/or LiOH.

The invention further relates to the use of the preparations according to the invention for the dyeing and printing of cellulosic materials, in particular paper and pulp after dissolution in water and optional adjustment of the pH to from 11 to 13, and for the preparation of printing inks, in particular those for inkjet printing, after dissolution of the preparations in an aqueous solvent. For the preparation of inkjet inks it is preferable that the preparation according to the invention has been demineralized by means of a membrane technique prior to its drying.

In general, the following possibilities exist for the dyeing of papers and pulps:

(a) beater dyeing, in which the dyes or aqueous dye preparations are added to the pulp slurry which has not yet been processed to give paper, during or after beating of the cellulose.

(b) surface dyeing, in which the dyes or aqueous dye preparations are added to the sizing liquor during the paper sizing operation.

Furthermore, other suitable methods are those in which a coating slip comprising dyes, inorganic white pigments, binders and optionally further additives is applied to the surface of the paper.

The aqueous dye preparation prepared from the preparation according to the invention after dissolution in water is suitable for any dyeing method, but preferably for beater dyeing.

In beater dyeing, the cellulose is preferably firstly beaten to a certain freeness. Then, 0.01–2.0% of the dye formulation according to the invention is added to the pulp slurry at 10–40° C., an amount of active substance of generally from 0.01 to 2.0%, based on the dry weight of the pulp, being used. Furthermore, if required, customary sizing agents, aluminium sulphates, paper reinforcing agents, fixing agents etc. are added subsequently. The pulp is then subjected to the customary papermaking and drying operations. This. method gives a paper which is uniformly dyed brilliant blue.

In the case of surface dyeing in the sizing press, the cellulose is preferably likewise firstly beaten to a certain freeness.

Then, if required, customary fillers, sizing agents, aluminium sulphates, fixing agents etc. are added to the pulp slurry. The pulp slurry is then processed by a customary method to give paper. The paper is then treated in the sizing press with a sizing liquor which comprises the aqueous dye preparation, and subsequently dried. This method gives a paper dyed brilliant turquoise blue.

In this connection, the content of phthalocyanine dye in the sizing press liquor is generally 0.04–2.0% (calculated on the basis of the pure content), and the layer of the coating slip is generally 1–3 g/m$^2$ (solids content), based on the dry weight of the paper.

The aqueous dye preparations exhibit a high affinity for cellulose fibres and therefore result in a good colour yield (good depth of colour). The dyed papers are characterized by good fastness to water and bleeding.

The phthalocyanine solutions obtained by the process according to the invention are preferably suitable for the printing of substrates using an inkjet recording system, in particular as recording fluid. Such a recording fluid preferably comprises 0.5–15% of an alkali metal or ammonium salt of phthalocyanine, from 0 to 30% of one or more water-soluble organic solvents, water and optionally further additives customary for inkjet recording fluids, and has a pH from 9 to 1.

Suitable water-soluble solvents are, for example, glycols and glycol ethers such as ethylene glycol, diethylene glycol, triethylene glycol, 1,2-dihydroxypropane, 1-ethoxy-2-hydroxypropane, polyethylene glycols having molecular weights up to 500 g/mol, heterocyclic,. ketones such as 2-pyrrolidone, 2-(N-methyl)pyrrolidone and 1,3-dimethylimidazolin-2-one.

The inkjet recording process is known per se. It involves firing droplets of a recording fluid from one or more small nozzles in a targeted manner onto a substrate, e.g. onto paper, wood, textiles, plastic or metal. Individual droplets are grouped together by electronic control to form script characters or graphics.

The examples below serve to illustrate the present invention.

Unless stated otherwise, "parts" are parts by weight.

EXAMPLES

Example 1

An aqueous solution of the copper phthalocyanine dye of the formula

prepared in accordance with the details in EP-A-596 383, Example 1 was adjusted to pH 12.5 to 13.0 using 50% strength sodium hydroxide solution. The solution comprised about 14% by weight of dye and about 4% by weight of sodium chloride. This solution was spray dried in a pressure nozzle tower to give granules at an inlet temperature of 170° C. and an outlet temperature of about 70° C. The granules have an average particle diameter of about 250 μm, and the residual moisture is about 7%. The granules are free-flowing, storage-stable and low in dust, and 1 part thereof dissolved completely in 10 parts of water to give a deep-blue solution with a pH of 12.5 which can be used directly for dyeing paper.

Example 2

An aqueous solution of the copper phthalocyanine dye of the formula

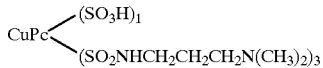

was adjusted to pH 13.0 and spray dried as in Example 1. This gave free-flowing and storage-stable granules which were low in dust and had an average particle diameter of about 280 μm, and 1 part of which dissolved completely in 10 parts of water to give a deep-blue solution with a pH of from 12.5 to 13.0, and this solution was used directly for the beater dyeing of paper.

Example 3

In accordance with Examples I and 2, the following dyes were prepared in the form of their solid granules by spray dyring.

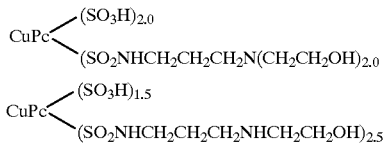

The resulting granules are low in dust, free-flowing and storage-stable and have an average particle size of in each case about 250 μm. They dissolve completely in 10 times the amount of water, the pH in each case being about 12.5.

What is claimed is:

1. A solid preparation comprising a metal-containing or metal-free phthalocyanine dye wherein
   a) the average particle size of the solid preparation is greater than 100 μm, and
   b) an aqueous solution of one part by weight of the solid preparation in 10 parts by weight of water exhibits a pH greater than or equal to 10.

2. A solid preparation according to claim 1 wherein the pH of an aqueous solution of one part by weight of the solid preparation in 10 parts by weight of water is from 10 to 13.

3. A solid preparation according to claim 1, wherein the average particle size of the solid preparation is from 100 to 800 μm.

4. A solid preparation according to claim 1 comprising
   1) from 60 to 98% by weight, based on the solid preparation, of a metal-containing or metal-free phthalocyanine dye,
   2) from 2 to 12% by weight, based on the solid preparation, of residual moisture,
   3) from 0 to 25% by weight, based on the solid preparation, of inorganic salts,
   4) from 0 to 4% by weight, based on the solid preparation, of further additives selected from surfactants, wetting agents, dedusting agents, and bases,
   wherein the sum of said components totals 100%.

5. A solid preparation according to claim 1 wherein the phthalocyanine dye is a metal-containing phthalocyanine.

6. A solid preparation according to claim 1 wherein the phthalocyanine dye is a Cu or Ni phthalocyanine.

7. A solid preparation according to claim 1 wherein the phthalocyanine dye is a copper phthalocyanine containing sulphonamide groups and sulpho groups.

8. A solid preparation according to claim 7 therein 0.5 to 3 sulpho acid groups per phthalocyanine are present.

9. A solid preparation according to claim 1 wherein the phthalocyanine dye is a copper phthalocyanine that, in the acid form, carries
   y $SO_3H$ groups and
   x identical or different radicals of the formula —$SO_2$NHB, with the proviso that if the $SO_2$NHB radicals are different, the total number of the different radicals per molecule is x,
wherein
   B is an optionally substituted aliphatic or cycloaliphatic radical,
   x is from 1 to 3.5,
   y is from 0.5 to 3.0, and
the sum x+y is from 2.5 to 4.

10. A solid preparation according to claim 1 wherein the phthalocyanine dye is a copper phthalocyanine that, in the acid form, corresponds to the formula (I)

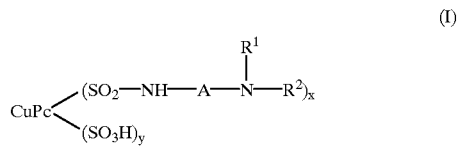

wherein
   CuPC is a copper phthalocyanine radical,
   A is an unsubstituted or substituted straight-chain or branched $C_2$–$C_6$-alkylene,
   $R^1$ and $R^2$ independently are hydrogen or an unsubstituted or substituted straight-chain or branched $C_1$–$C_6$-alkyl, or $R^1$ and $R^2$ together with the N atom to which they are bonded form a 5- or 6-membered heterocyclic ring that optionally contains other heteroatoms,
   x is from 1 to 3.5,
   y is from 0.5 to 3, and
the sum x+y is from 2.5 to 4.

11. A solid preparation according to claim S wherein $R^1$ and $R^2$ are unsubstituted or substituted $C_1$–$C_6$-hydroxyalkyl.

12. A process for the preparation of a solid phthalocyanine preparation according to claim 1 comprising
   1) adjusting the pH of an aqueous solution or suspension of a metal-containing or metal-free phthalocyanine to a pH such that one part by weight of the dried phthalocyanine preparation obtained in step 3), when dissolved in 10 parts by weight of water, exhibits a pH greater than or equal to 10, 2) optionally, adding additives to the solution or suspension, and 3) drying the solution or suspension to obtain the solid phthalocyanine preparation.

13. A method for dyeing or printing a cellulosic material comprising applying to the cellulosic material a dye obtained by dissolving a solid preparation according to claim 1 in water.

14. A method for preparing a printing ink comprising dissolving a solid preparation according to claim 1 in an aqueous solvent.

* * * * *